(12) United States Patent
Chen et al.

(10) Patent No.: US 12,506,623 B2
(45) Date of Patent: Dec. 23, 2025

(54) MUTUAL AUTHENTICATION IN EDGE COMPUTING

(71) Applicant: Dell Products L.P., Round Rock, TX (US)

(72) Inventors: Kai Chen, Shanghai (CN); Jim Lewei Ji, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 17/968,237

(22) Filed: Oct. 18, 2022

(65) Prior Publication Data

US 2024/0129140 A1    Apr. 18, 2024

(30) Foreign Application Priority Data

Oct. 12, 2022    (CN) .......................... 202211246272.0

(51) Int. Cl.
*H04L 9/32*    (2006.01)
*H04L 9/30*    (2006.01)

(52) U.S. Cl.
CPC .............. *H04L 9/3273* (2013.01); *H04L 9/30* (2013.01); *H04L 9/3231* (2013.01); *H04L 9/3297* (2013.01)

(58) Field of Classification Search
CPC ....... H04L 9/3273; H04L 9/30; H04L 9/3231; H04L 9/3297; H04L 9/0825; G06F 21/445
See application file for complete search history.

(56) References Cited

U.S. PATENT DOCUMENTS

| | | | | |
|---|---|---|---|---|
| 11,757,662 | B2 * | 9/2023 | Le Saint | H04L 9/3271 |
| | | | | 713/171 |
| 12,058,248 | B2 * | 8/2024 | Williams | H04L 9/0825 |
| 12,058,260 | B2 * | 8/2024 | Philipp | H04L 9/3218 |
| 2018/0173452 | A1 * | 6/2018 | Hu | G06F 3/067 |
| 2018/0232142 | A1 * | 8/2018 | Shekar | G06F 11/2046 |
| 2020/0295932 | A1 * | 9/2020 | Chien | H04L 63/205 |
| 2021/0233108 | A1 * | 7/2021 | Gouneili | H04N 21/6582 |
| 2022/0069995 | A1 * | 3/2022 | Philipp | H04L 9/3218 |
| 2022/0417182 | A1 * | 12/2022 | Lochhead | G06F 3/04842 |
| 2023/0155825 | A1 * | 5/2023 | Wu | H04L 9/3231 |
| | | | | 380/44 |
| 2024/0073024 | A1 * | 2/2024 | Bertocci | H04L 9/30 |

OTHER PUBLICATIONS

Alfred Menezes, Paul C. van Oorschot, and Scott A. Vanstone. "Handbook of Applied Cryptography" (C)1997 CRC Press LLC. (pp. 1-780) (Year: 1997).*

* cited by examiner

*Primary Examiner* — Thomas A Gyorfi
(74) *Attorney, Agent, or Firm* — Jackson Walker L.L.P.

(57) ABSTRACT

An information handling system may include at least one processor and a memory. The information handling system may be configured to receive, from a second information handling system, a physical identifier, a biological identifier, and a timestamp; determine a public key and a private key for the second information handling system based on the physical identifier, the biological identifier, and the timestamp; generate a random message; encrypt the random message with the public key for the second information handling system; transmit the encrypted random message to the second information handling system; and in response to a determination that the second information handling system has successfully decrypted the random message, authenticate the second information handling system.

18 Claims, 1 Drawing Sheet

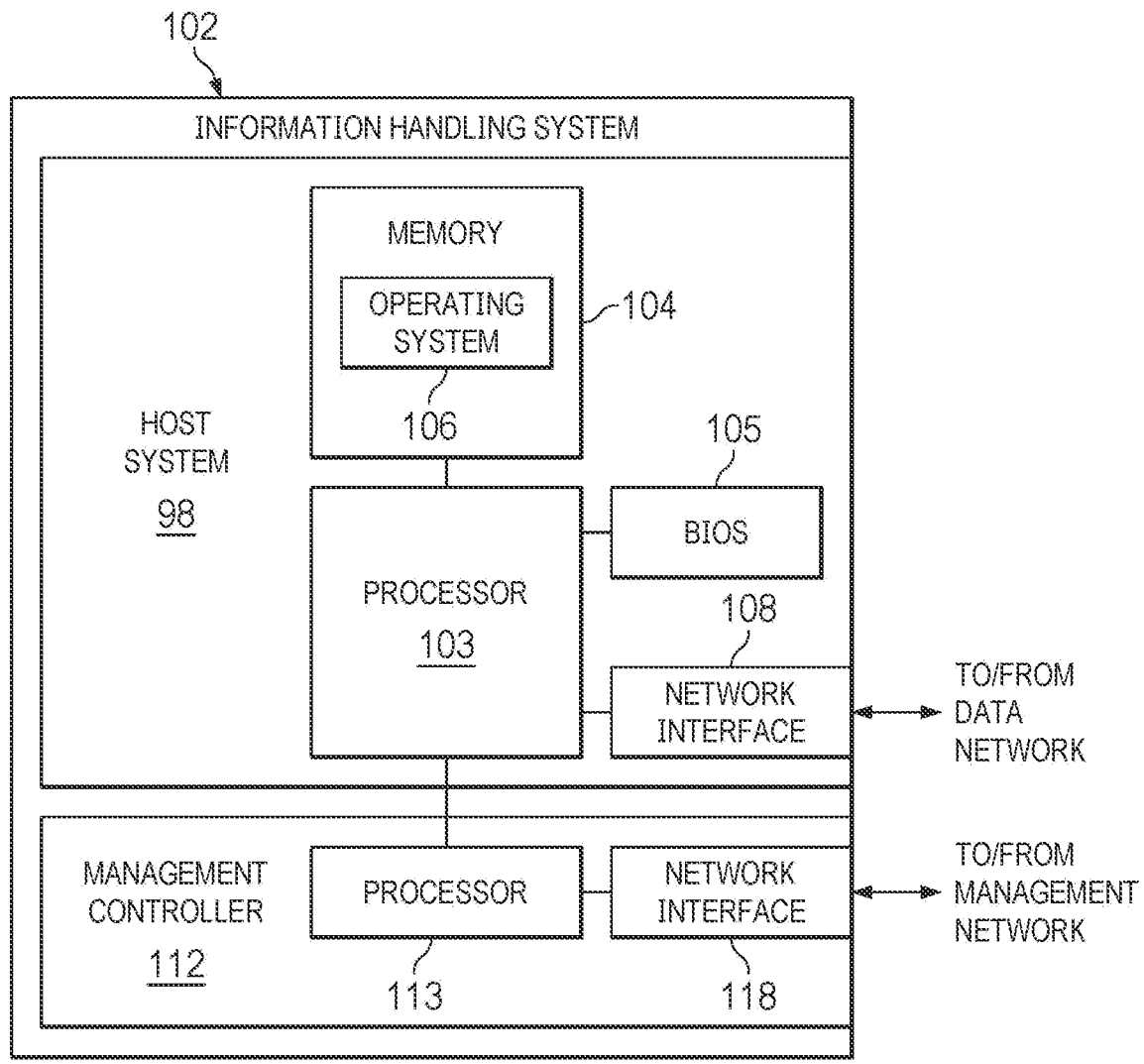

MUTUAL AUTHENTICATION IN EDGE COMPUTING

TECHNICAL FIELD

The present disclosure relates in general to information handling systems, and more particularly to techniques for authentication.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Mutual authentication refers generally to techniques for allowing two parties (e.g., two information handling systems) to verify each other's identities, typically by providing digital certificates and verifying those certificates. Various protocols for mutual authentication exist, such as Secure Sockets Layer (SSL), Transport Layer Security (TLS), etc. Some mutual authentication protocols rely on Public Key Infrastructure (PKI).

In some scenarios, however, physical security challenges can cause problems for mutual authentication. For example, edge computing may expose edge devices to untrusted parties, and sensitive information such as the private keys and/or certificates used for mutual authentication can be exposed through such physical access.

Thus embodiments of this disclosure provide enhanced mutual authentication, which may be particularly useful in scenarios in which physical security cannot be guaranteed.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with authentication may be reduced or eliminated.

In accordance with embodiments of the present disclosure, an information handling system may include at least one processor and a memory. The information handling system may be configured to receive, from a second information handling system, a physical identifier, a biological identifier, and a timestamp; determine a public key and a private key for the second information handling system based on the physical identifier, the biological identifier, and the timestamp; generate a random message; encrypt the random message with the public key for the second information handling system; transmit the encrypted random message to the second information handling system; and in response to a determination that the second information handling system has successfully decrypted the random message, authenticate the second information handling system.

In accordance with these and other embodiments of the present disclosure, a method may include an information handling system receiving, from a second information handling system, a physical identifier, a biological identifier, and a timestamp; the information handling system determining a public key and a private key for the second information handling system based on the physical identifier, the biological identifier, and the timestamp; the information handling system generating a random message; the information handling system encrypting the random message with the public key for the second information handling system; the information handling system transmitting the encrypted random message to the second information handling system; and in response to a determination that the second information handling system has successfully decrypted the random message, the information handling system authenticating the second information handling system.

In accordance with these and other embodiments of the present disclosure, an article of manufacture may include a non-transitory, computer-readable medium having computer-executable instructions thereon that are executable by a processor of an information handling system for: receiving, from a second information handling system, a physical identifier, a biological identifier, and a timestamp; determining a public key and a private key for the second information handling system based on the physical identifier, the biological identifier, and the timestamp; generating a random message; encrypting the random message with the public key for the second information handling system; transmitting the encrypted random message to the second information handling system; and in response to a determination that the second information handling system has successfully decrypted the random message, authenticating the second information handling system.

Technical advantages of the present disclosure may be readily apparent to one skilled in the art from the FIGURES, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an example information handling system, in accordance with embodiments of the present disclosure.

DETAILED DESCRIPTION

Preferred embodiments and their advantages are best understood by reference to FIG. 1, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in mutual authentication between multiple information handling systems 102 (e.g., a central system and an edge system). For the sake of clarity and concreteness, the example of TLS authentication will be discussed in detail herein. One of ordinary skill with the benefit of this disclosure will appreciate its applicability to other authentication schemes, however.

In situations in which the physical security of an edge system is suspect, it may be desirable to generate cryptographic keys dynamically instead of retaining secret information in a potentially insecure location. Accordingly, one embodiment employs a physical identifier (e.g., a device ID, service tag, or any other suitable identifier associated with the edge system) as well as a biological identifier (e.g., a user's fingerprint, retinal scan, or any other suitable biometric) to generate a PKI certificate, a cryptographic key, and/or a cryptographic key pair dynamically. The result may then be used for mutual TLS authentication. Because these items need not be stored persistently in the edge system, it may be more difficult for an attacker to compromise the edge system or to manipulate the central system through the edge system.

In one embodiment, the central system and the edge system may also implement multiple cryptographic algorithms (e.g., SHA512, SHA384, symmetric encryption, etc.) and dynamically select one of such algorithms to be used during each round of communication. The algorithm may be selected randomly or pseudorandomly, and the selection may be based on the current time in some embodiments (e.g., by consulting an atomic clock or network time server) to allow both parties to agree on the algorithm. In one embodiment, the current time may also be used as a seed for generating a PKI certificate and/or cryptographic key, such that it is only valid during a single round of communications (e.g., until the clock reference increments to the next minute, etc.).

The following section describes in more detail a particular embodiment of a mutual authentication scenario involving a central system and one or more edge systems. The central system may be provisioned with the physical identifiers and biological identifiers associated with all edge systems before the edge systems are deployed to the edge environment. In this discussion, E refers to an edge system, C refers to the central system, PK refers to a public key, SK refers to a private (secret) key, and ACP refers to the atomic clock phase (e.g., the current time data as received from a network time server) or any other suitable timestamp.

In the first portion of this scenario (steps 1-4 below), the edge system is registered with the central system.

1. The central system may have its own public and private key pair, referred to as [$PK_C$, $SK_C$]. The central system need not dynamically generate its public and private keys, and so these keys may be generated in the ordinary course and stored persistently and securely in the central system.

2. The edge system may be in possession of the central system's public key $PK_C$ via PKI, device provisioning, etc. The edge system may transmit identity information (e.g., a service tag or other device identifier) and atomic clock phase information when registering itself with the central system. In particular, the public and private keys for the edge device may be generated at both the central system and the edge system as a cryptographic function F that incorporates the edge system's transmitted physical identifier PhyID, the transmitted biological identifier BioID, and the transmitted atomic clock phase information ACP. In some embodiments, the cryptographic function may also incorporate the central system's own public key:

$$[PK_E, SK_E] = F(PhyID, BioID, ACP, PK_C)$$

3. $PK_E$ may then be stored at the central system along with the identity information of the edge system. The central system may store $PK_E$ in the clear in some embodiments (e.g., without the need to keep it in any cryptographic vault or the like).

4. At the edge system, the same key pair $[PK_E, SK_E]$ may be generated by the same procedure based on the fixed PhyID and BioID, the variable atomic clock phase ACP, and the central system's public key $PK_C$.

In order for an attacker to compromise the system, the attacker would need the PhyID, BioID, and ACP to generate the edge private key $SK_E$. Further, the attacker would need to know which cryptographic algorithm is in use at the specific time based on the ACP.

In the second portion of this scenario, the edge system is authenticated to the central system. The second portion (steps 1-5 below) may be repeated whenever a new authentication session begins, because the edge system's key pair $[PK_E, SK_E]$ may change periodically (e.g., each minute).

1. The edge system may submit an identity authentication application to the central system.

2. The central system may then require the edge system to prove that it possesses the required secret $SK_E$. In particular, the central system may look up the edge system's public key $PK_E$ and use it to encrypt a random message: EncryptedMsg=Encode(RandomMsg, $PK_E$). (For purposes of this disclosure, the term "random" should be understood to include pseudorandom procedures as well.) The encrypted random message EncryptedMsg may then be sent to the edge system.

3. The edge system may then prove that it possesses the required secret. To do so, the edge system may first re-generate its own key pair according to:

$$[PK_E, SK_E] = F(PhyID, BioID, ACP, PK_C)$$

The edge system may then decrypt the received message and re-encrypt the result with the central system's public key:

EncryptedMsg'=Encode(Decode(EncryptedMsg,$SK_E$), $PK_C$)

The edge system may also generate a second random message denoted as Key for use in symmetric encryption to communicate with the central system going forward. The edge system may also encrypt the newly generated Key and its combined identifying information with its own private key:

EncryptedKey=Encode(Key,$SK_E$)

EncryptedID=Encode("PhyID+BioID",$SK_E$)

The edge system may then send EncryptedMsg', EncryptedKey, and EncryptedID to the central system.

The central system may authenticate the edge system's identity and verify that it possesses the required secret knowledge by decrypting EncryptedMsg' and verifying that it matches the original RandomMsg:

Decode(EncryptedMsg',$SK_C$)=?RandomMsg

If the result matches, then the identity authentication of the edge system is accepted.

The central system may then proceed to decrypt the EncryptedID with the edge system's public key $PK_E$ and verify that the resulting PhyID and BioID match its records for that edge system. If they match, then the central system may proceed to decrypt the Key with the edge system's public key PK E and use Key going forward as a symmetric encryption key for encrypting and decrypting subsequent communications with the edge system.

When the central system sends a message to the edge system that has been encrypted with Key, the edge system may decrypt the message with Key to authenticate the central system's identity. For example, if the result of such decryption is a semantically normal message (e.g., as opposed to random data), then the edge system may conclude that the identity authentication of the central system should be accepted. Once the two systems have mutually authenticated one another, they may be assured that they are communicating with the correct, known party. Based on the authentication, they may proceed to transmit information (e.g., sensitive information) to one another.

The edge system and the central system may then continue using Key as a symmetric encryption key for further messages until the time of the next authentication session.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   receive, from a second information handling system, a physical identifier, a biological identifier, and a timestamp;
   calculate a public key and a private key for the second information handling system by applying a cryptographic function to the physical identifier, the biological identifier, and the timestamp;

generate a random message;

encrypt the random message with the public key for the second information handling system, wherein the random message is encrypted according to a particular encryption algorithm that is selected from a group of encryption algorithms based at least in part on the timestamp;

transmit the encrypted random message to the second information handling system; and in response to a determination that the second information handling system has successfully decrypted the random message, authenticate the second information handling system.

2. The information handling system of claim 1, wherein the information handling system is a hyper-converged infrastructure (HCI) system.

3. The information handling system of claim 2, wherein the second information handling system is an edge node of the HCI system.

4. The information handling system of claim 1, wherein the biological identifier is a fingerprint.

5. The information handling system of claim 1, wherein the physical identifier is a device identifier of the second information handling system.

6. The information handling system of claim 1, wherein determining that the second information handling system has successfully decrypted the random message comprises receiving, from the second information handling system, the random message encrypted with a public key for the information handling system.

7. A method comprising:

an information handling system receiving, from a second information handling system, a physical identifier, a biological identifier, and a timestamp;

the information handling system calculating a public key and a private key for the second information handling system by applying a cryptographic function to the physical identifier, the biological identifier, and the timestamp;

the information handling system generating a random message;

the information handling system encrypting the random message with the public key for the second information handling system, wherein the random message is encrypted according to a particular encryption algorithm that is selected from a group of encryption algorithms based at least in part on the timestamp;

the information handling system transmitting the encrypted random message to the second information handling system; and in response to a determination that the second information handling system has successfully decrypted the random message, the information handling system authenticating the second information handling system.

8. The method of claim 7, wherein the information handling system is a hyper-converged infrastructure (HCI) system.

9. The method of claim 8, wherein the second information handling system is an edge node of the HCI system.

10. The method of claim 7, wherein the biological identifier is a fingerprint.

11. The method of claim 7, wherein the physical identifier is a device identifier of the second information handling system.

12. The method of claim 7, wherein determining that the second information handling system has successfully decrypted the random message comprises receiving, from the second information handling system, the random message encrypted with a public key for the information handling system.

13. An article of manufacture comprising a non-transitory, computer-readable medium having computer-executable instructions thereon that are executable by a processor of an information handling system for:

receiving, from a second information handling system, a physical identifier, a biological identifier, and a timestamp;

calculating a public key and a private key for the second information handling system by applying a cryptographic function to the physical identifier, the biological identifier, and the timestamp;

generating a random message;

encrypting the random message with the public key for the second information handling system, wherein the random message is encrypted according to a particular encryption algorithm that is selected from a group of encryption algorithms based at least in part on the timestamp;

transmitting the encrypted random message to the second information handling system; and in response to a determination that the second information handling system has successfully decrypted the random message, authenticating the second information handling system.

14. The article of claim 13, wherein the information handling system is a hyper-converged infrastructure (HCI) system.

15. The article of claim 14, wherein the second information handling system is an edge node of the HCI system.

16. The article of claim 13, wherein the biological identifier is a fingerprint.

17. The article of claim 13, wherein the physical identifier is a device identifier of the second information handling system.

18. The article of claim 13, wherein determining that the second information handling system has successfully decrypted the random message comprises receiving, from the second information handling system, the random message encrypted with a public key for the information handling system.

* * * * *